(12) United States Patent
Sun (10) Patent No.: US 9,485,120 B1
(45) Date of Patent: Nov. 1, 2016

(54) METHOD AND APPARATUS FOR SIGNAL DETECTION AND BASELINE WANDER CANCELLATION

(71) Applicant: MARVELL INTERNATIONAL LTD., Hamilton (BM)

(72) Inventor: Junqing Sun, Fremont, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/834,718

(22) Filed: Aug. 25, 2015

Related U.S. Application Data (60) Provisional application No. 62/042,617, filed on Aug. 27, 2014.

(51) Int. Cl.
| | |
|---|---|
| H03H 7/30 | (2006.01) |
| H03K 5/159 | (2006.01) |
| H04L 27/01 | (2006.01) |
| H04L 25/03 | (2006.01) |
| H04L 12/26 | (2006.01) |
| H04L 25/06 | (2006.01) |

(52) U.S. Cl.
CPC ......... *H04L 25/03057* (2013.01); *H04L 25/06* (2013.01); *H04L 43/16* (2013.01)

(58) Field of Classification Search
USPC ........ 375/229–236, 211, 219, 221, 222, 240, 375/240.26–240.29, 240.12–240.13, 254, 375/259, 284, 285, 295, 296, 346, 350, 340, 375/342
See application file for complete search history.

(56) References Cited

U.S. PATENT DOCUMENTS

| | | | | |
|---|---|---|---|---|
| 6,975,678 | B1 * | 12/2005 | Le | H04B 3/143 |
| | | | | 375/232 |
| 7,924,079 | B2 * | 4/2011 | Schmand | G01T 1/248 |
| | | | | 327/307 |
| 2010/0246649 | A1 * | 9/2010 | de Ruijter | H04B 3/46 |
| | | | | 375/224 |
| 2014/0192935 | A1 * | 7/2014 | Palusa | H04L 7/033 |
| | | | | 375/340 |
| 2016/0020952 | A1 * | 1/2016 | Berke | H04L 12/40 |
| | | | | 370/252 |

\* cited by examiner

*Primary Examiner* — Linda Wong (57) ABSTRACT

Apparatus, methods, and other embodiments associated with reliably determining signal loss over a data communication channel have been described. According to one embodiment, a method includes receiving input signals at an input of a serializer/deserializer device and equalizing the input signals to form equalized signals which compensate for frequency response distortion. The method also includes analyzing the equalized signals to determine whether peak amplitudes of the equalized signals are within a range of amplitudes defined by two threshold values. Furthermore, the method includes analyzing the equalized signals to determine whether logic levels of the equalized signals correspond to a sequence of a same logic level. The method further includes generating a signal absent indicator when the peak amplitudes of the equalized signals are within the range, or when the logic levels of the equalized signals correspond to the sequence of the same logic level.

19 Claims, 7 Drawing Sheets

METHOD AND APPARATUS FOR SIGNAL DETECTION AND BASELINE WANDER CANCELLATION

CROSS REFERENCE TO RELATED APPLICATIONS

This patent disclosure claims the benefit of U.S. Provisional Application Ser. No. 62/042,617 filed on Aug. 27, 2014, which is incorporated herein by reference.

BACKGROUND

A serializer/deserializer (SerDes) is a device that is often used in high speed communication systems to facilitate data transmission through a limited number of lines. In general, a SerDes can take a wide bit-width signal bus and reduce the signal bus to, for example, a single differential signal line. The single differential signal line can switch at higher speeds than the wide bit-width signal bus. As a result, a SerDes can facilitate the efficient movement of large amounts of data from one point to another, without having to transmit the data from one point to another over wide parallel data buses. A SerDes may employ techniques to detect whether valid data traffic is present on the signal lines. When valid data traffic is determined to be present, a SerDes may start a training sequence and then transmit and receive data. When valid data traffic is determined to be absent, a SerDes may send a signal to reset or power down a receiver portion of the SerDes associated with receiving data. Therefore, the ability to reliably determine the presence or absence of valid data traffic, while performing other functions such as baseline wander cancellation, is very important in SerDes operation.

SUMMARY

In general, in one aspect this specification discloses an apparatus that includes signal detection logic configured to determine when peak amplitudes of equalized receiver signals are within or outside of a range of amplitudes. The range of amplitudes is defined by two threshold values. The equalized receiver signals are derived from raw receiver input signals. The apparatus also includes decision logic configured to determine logic levels of the equalized receiver signals, and stream detection logic configured to determine when the logic levels of the equalized receiver signals correspond to a sequence of a same logic level. The apparatus also includes signal loss logic configured to determine when valid data traffic is absent among the raw receiver input signals. Valid data traffic is determined to be absent when the peak amplitudes of the equalized receiver signals are within the range as determined by the signal detection logic, or when the logic levels of the equalized receiver signals correspond to the sequence of the same logic level as determined by the stream detection logic.

In general, in another aspect, this specification discloses a method that is performable by, for example, a serializer/deserializer (SerDes) device. The method includes receiving input signals at an input of the SerDes device. The method also includes equalizing the input signals by compensating for frequency response distortion to form equalized signals. The method further includes analyzing the equalized signals to determine whether peak amplitudes of the equalized signals are within a range of amplitudes defined by two threshold values. The method may also include analyzing the equalized signals to determine whether logic levels of the equalized signals correspond to a sequence of a same logic level. The method further includes generating a signal absent indicator. The signal absent indicator indicates that valid data traffic is absent among the input signals. The signal absent indicator is generated when the peak amplitudes of the equalized signals are within the range, or when the logic levels of the equalized signals correspond to a sequence of a same logic level.

In general, in another aspect, this specification discloses an integrated circuit device. In one embodiment, the integrated circuit device includes an equalization circuit configured to generate equalized receiver signals derived from raw receiver input signals by compensating for frequency response distortion in the raw receiver input signals. A signal detection circuit is configured to determine when peak amplitudes of the equalized receiver signals are within or outside of a range of amplitudes. The range of amplitudes is defined by two threshold values. The integrated circuit device also includes a decision circuit configured to determine logic levels of the equalized receiver signals, and a stream detection circuit configured to determine when the logic levels of the equalized receiver signals correspond to a sequence of a same logic level.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, apparatuses, methods, and other embodiments associated with reliably detecting signal loss over a data communication channel of a data communication network. In particular, embodiments are described herein that are associated with serializer/deserializer (SerDes) devices, having baseline wander cancellation functionality, that reliably determine when valid data traffic is absent among raw input signals received by the SerDes device over the data communication channel.

A SerDes device supports data communication in high speed communication systems for data transmission through a limited number of lines. In one embodiment, a SerDes device includes a receiver portion having an alternating current (A/C) coupling filter and a baseline wander canceller (BLWC). The A/C coupling filter may be a high-pass filter configured to remove direct current (DC) signals, in accordance with one embodiment. When passing through the A/C coupling filter, random signals may drift to one side or another of a baseline signal level. In one embodiment, the BLWC is configured to compensate for such drifting.

Furthermore, in one embodiment, the SerDes device also includes a signal detector (SIGDET) configured to determine whether there are valid signals on a communication channel operably connected to the SerDes device, for example, through a physical layer (PHY) of the communication network. If valid signals are present, the SerDes device can start a training sequence and then transmit and receive data. The SerDes device also includes a stream detector for detecting sequences of data bits having a same logic level (e.g. all 0's or all 1's).

In accordance with one embodiment, for a SerDes having both a BLWC and a SIGDET, both the SIGDET and the stream detector are involved in determining signal loss (i.e., no valid signals present). The stream detector acts as a check on the SIGDET, in accordance with one embodiment. For example, operation of the BLWC in some circumstances may cause the SIGDET to incorrectly report that valid signals are present when, in fact, they are not present. If the stream detector detects a sequence of data bits (being of at least a defined length) having a same logic level, even though the SIGDET reports that valid signals are present, the SerDes will function as if signal loss has occurred. As a result, when it is determined that valid signals are not present (i.e., that signal loss has occurred), a reset signal can be reliably generated to reset or power down the SerDes receiver.

In this manner, BLWC functionality can be implemented while maintaining reliable determinations of signal loss. The BLWC effectively compensates for signal drift caused by the A/C coupling filter, and both the SIGDET and the stream detector reliably determine together whether signal loss has actually occurred.

The terms "receiver input signals" and "input signals" are used interchangeably herein.

The terms "raw receiver input signals", "raw receiver signals", and "raw input signals" are used interchangeably herein and refer to electrical or optical signals, coming into an input of a receiving device (e.g., a serializer/deserializer device), that have not yet been processed by the receiving device.

The terms "equalized receiver signals", equalized receiver input signals, and "equalized signals" are used interchangeably herein and refer to signals that are derived from raw receiver input signals and compensate for frequency response distortion in the raw receiver input signals.

The term "valid data traffic", as used herein, refers to modulated signals carrying information over a communication channel as opposed to, for example, electrical noise signals or direct current (DC) signals.

Figure 1:
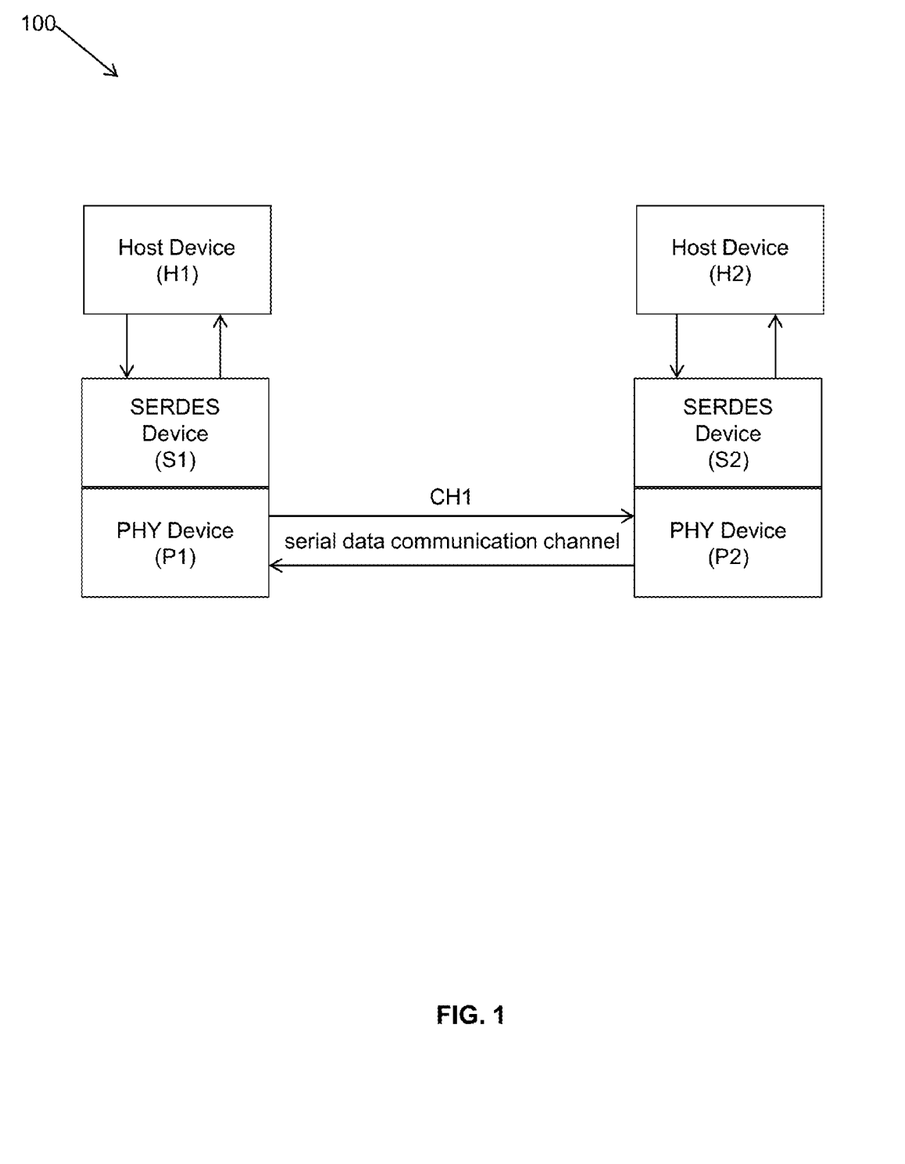
FIG. 1 illustrates one embodiment of a data communication network configured with serializer/deserializer (SerDes) devices to communicate data from one place to another.

FIG. 1 illustrates one embodiment of a data communication network 100 configured with serializer/deserializer (SerDes) devices S1 and S2 to communicate data from one place to another. In FIG. 1, data is communicated between a first host device H1 and a second host device H2 over a two-way serial data communication channel CH1. The SerDes device S1 and a physical layer (PHY) device P1 are intermediate between the host device H1 and the serial data communication channel CH1. Similarly, the SerDes device S2 and a physical layer (PHY) device P2 are intermediate between the host device H2 and the serial data communication channel CH1.

In one embodiment, the first host device H1 and the second host device H2 are switches within the data communication network 100, which function to channel data from any of multiple input ports to an output port that will take the data toward an intended destination. The serial data communication channel CH1 may be a differential twisted pair of wires, in accordance with one embodiment. The SerDes device S1 and the SerDes device S2 support two way communications through the channel CH1 by performing parallel-to-serial and serial-to-parallel transformations of data. In this manner, wide bit-width data signals originating on wide bit-width data buses can be communicated over a single differential signal line at high speeds.

Figure 2:
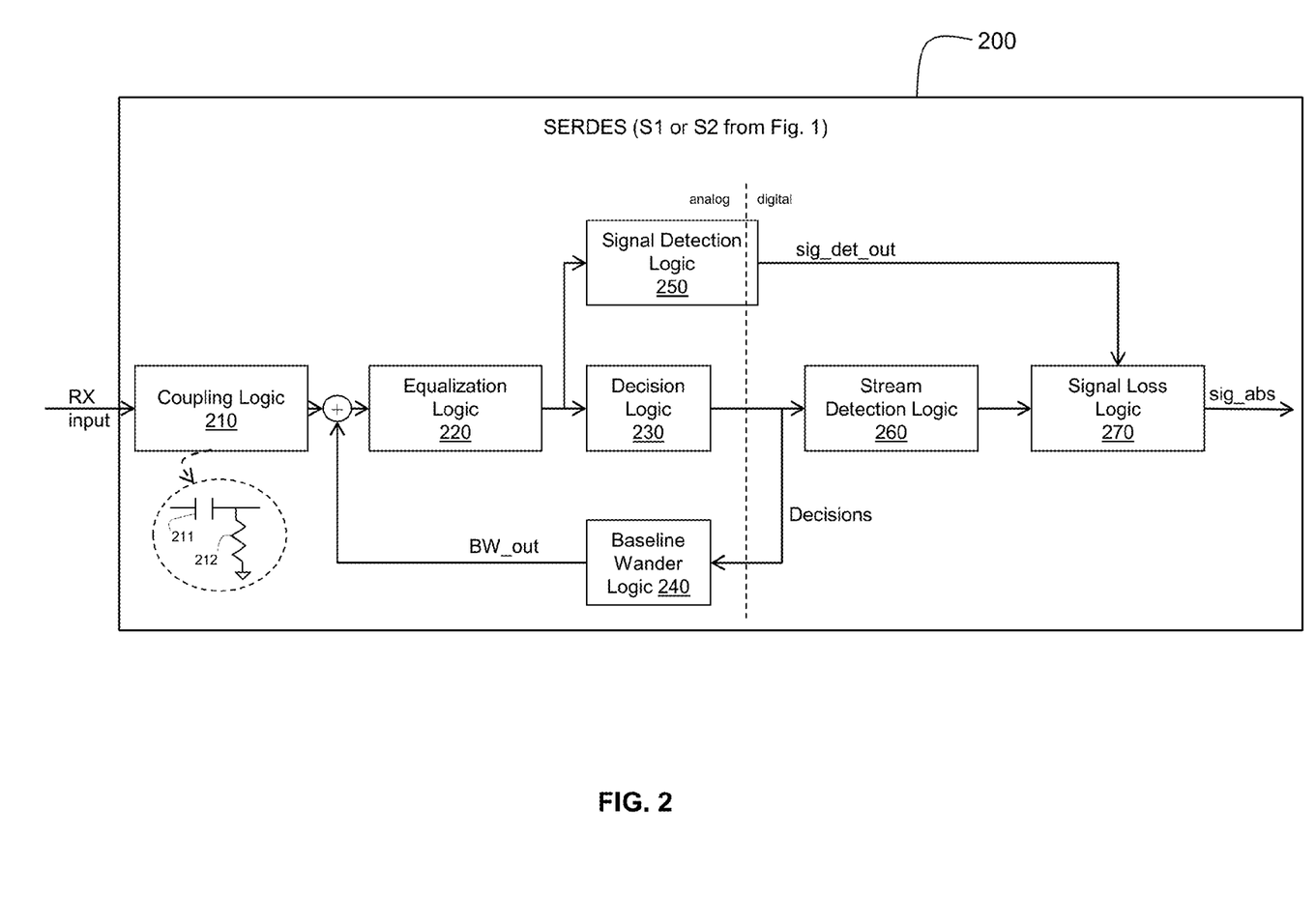
FIG. 2 illustrates one embodiment of a SerDes device of the data communication network of FIG. 1.

FIG. 2 illustrates one embodiment of a SerDes device 200. The SerDes device 200 includes coupling logic 210, equalization logic 220, decision logic 230, baseline wander logic 240, signal detection logic 250, stream detection logic 260, and signal loss logic 270. As seen in FIG. 2, some portions of the logics of the SerDes device 200 are implemented as analog technologies and other portions of the logics are implemented as digital technologies.

Other embodiments may provide different logics or combinations of logics that provide the same or similar functionality as the SerDes device 200 of FIG. 2. In one embodiment, certain logics of the SerDes device 200 are executable instructions including algorithms and/or program modules configured to perform the functions of the logics. The instructions are stored in a non-transitory computer storage medium. That is, in one embodiment, certain logics of the SerDes device 200 are implemented as modules of computer-executable instructions stored on a computer-readable medium. In another embodiment, the SerDes device 200 is implemented on a chip (i.e., a system-on-chip or SOC configuration) including one or more integrated circuits configured to perform one or more of the functions described herein.

Referring back to the logics of the SerDes device 200, coupling logic 210 is configured to perform A/C coupling to remove direct current (DC) signals from raw receiver input signals coming into a receiver input (RX input) of the SerDes device 200. In one embodiment, coupling logic 210 includes a high-pass filter formed by a capacitor 211 and a resistor 212 as shown in a break-out of coupling logic 210 in FIG. 2. The raw receiver input signals may include pulse amplitude modulated (PAM) signals (analog signals) representing digital data (e.g., bits of 1's and 0's), in accordance with one embodiment.

Equalization logic 220 is configured to generate equalized receiver signals from the raw receiver input signals by compensating for frequency response distortion in the raw receiver input signals. For example, frequency response distortion can be caused by the data communication channel (e.g., CH1 in FIG. 1) over which the raw receiver input signals travel. Other causes of frequency response distortion of the raw receiver input signals are possible as well (e.g., elements of the PHY devices may cause distortion).

In accordance with one embodiment, the frequency response of the data communication channel is modeled. Equalization logic 220 is configured, based on the model, to effectively flatten the raw receiver input signals, thus removing distortions caused by the data communication channel. For example, in one embodiment, equalization logic 220 is configured to boost higher frequencies and attenuate lower frequencies of signals out of coupling logic 210. Equalization logic 220 may include, for example, amplifier circuitry having different gains at different frequencies.

The output of equalization logic 220 includes equalized receiver signals. The equalized receiver signals are input to decision logic 230. Decision logic 230 is configured to determine logic levels (e.g., logic 1's and 0's) of the bits of information in the equalized receiver signals. In accordance with one embodiment, decision logic 230 includes analog-to-digital (A/D) conversion circuitry and comparator circuitry to determine the logic levels.

Figure 3:
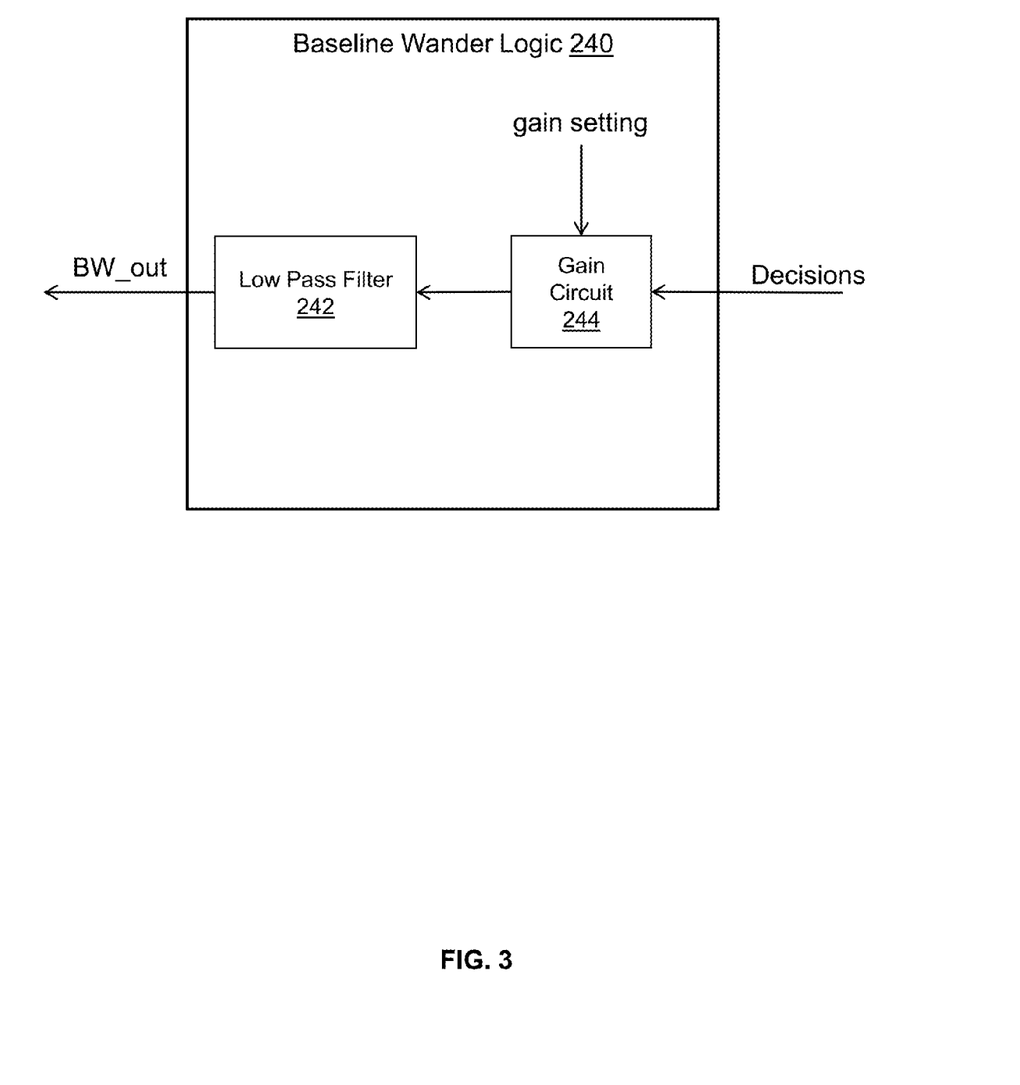
FIG. 3 illustrates one embodiment of baseline wander logic of the SerDes device of FIG. 2.

The output of decision logic 230 is input to baseline wander logic 240. Baseline wander logic 240 is configured to compensate for drift (i.e., baseline wander) of the raw receiver input signals caused by coupling logic 210. FIG. 3 illustrates one embodiment of baseline wander logic 240 of the SerDes device 200 of FIG. 2. Baseline wander logic 240 includes a low-pass filter 242 and a gain circuit 244. The determined logic level signals (decisions) from decision logic 230 are adjusted in accordance with a gain setting of the gain circuitry 244 and then low-pass filtered to produce a baseline wander output signal (BW_out). In accordance with one embodiment, the gain setting is based on the channel and A/C coupling filter bandwidth. The gain setting can be set manually, or by an adaptive loop from digital circuits, for example.

In one embodiment, the baseline wander output signal BW_out is fed back and effectively summed with the output of coupling logic 210. That is, baseline wander logic 240 acts as a positive feedback loop. As a result, the signals input to equalization logic 220 are compensated for drift caused by coupling logic 210. In accordance with one embodiment, the low-pass filter 242 of baseline wander logic 240 includes capacitor 211 and resistor 212 of the high-pass filter of coupling logic 210. By sharing circuit elements in this manner, the low-pass filter 242 of baseline wander logic 240 is matched to the high-pass filter of coupling logic 210, effectively solving the drifting problem (i.e., the baseline wander problem).

Figure 4:
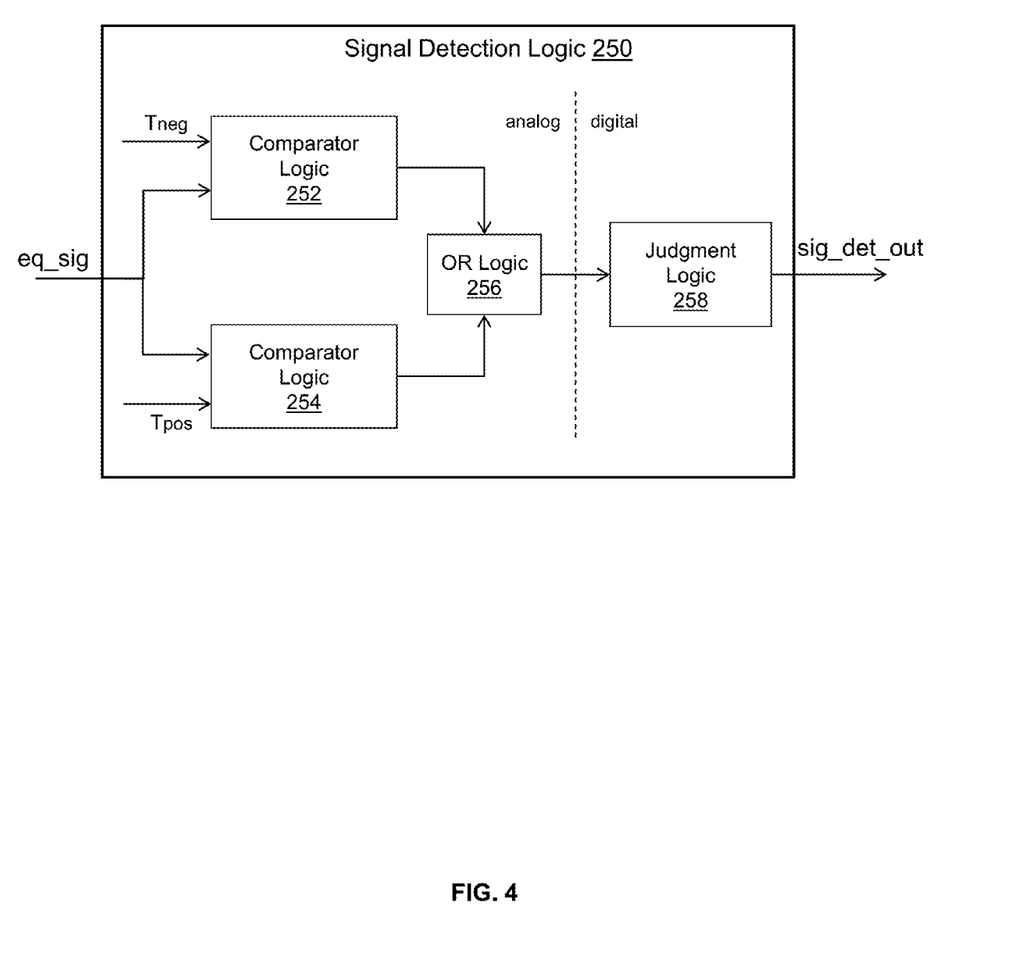
FIG. 4 illustrates one embodiment of signal detection logic of the SerDes device of FIG. 2.

Referring now back to FIG. 2, the equalized receiver signals are also input to signal detection logic 250. Signal detection logic 250 is configured to determine when peak amplitudes of the equalized receiver signals are within or outside of a range of amplitudes defined by two threshold values. FIG. 4 illustrates one embodiment of signal detection logic 250 of the SerDes device 200 of FIG. 2. Signal detection logic 250 includes comparator logics 252 and 254, OR logic 256, and judgment logic 258.

Referring to FIG. 4, the equalized receiver signals (eq_sig) come into comparator logics 254 and 252 and are compared to a positive threshold value $T_{pos}$ and a negative threshold value $T_{neg}$, respectively. The threshold values $T_{pos}$ and $T_{neg}$ define a range of amplitudes. If the signal amplitude is higher than $T_{pos}$ or lower than $T_{neg}$, the corresponding comparator logic output is a "logic 1". OR logic 256 generates a "logic 1" output if either of the comparator logics outputs a "logic 1". As a result, the comparator logics 252 and 254 can determine when peak amplitudes of the equalized receiver signals are within the range or not (i.e., amplitude ranging is performed).

The output of OR logic 256 is input to judgment logic 258. Judgment logic 258 is configured to determine that valid data traffic is present among the raw receiver input signals when the peak amplitudes of the equalized receiver signals are outside of the range. In particular, in one embodiment, judgment logic 258 determines whether there are valid signals present based on how many "logic 1's" are received within a certain time, and outputs a signal detection output (sig_det_out). If a determination is made by signal detection logic 250 that valid data traffic is present, the signal detection output (sig_det_out) may be used to command the Serdes device 200 to start a training sequence and then transmit and receive data.

The signal detection output may be a "logic 1" when signal detection logic 250 determines that valid signals are present for at least a defined period of time. Similarly, the signal detection output may be a "logic 0" when signal detection logic 250 determines that valid signals are not present for at least a defined period of time. The signal detection output, however, can be implemented using other conventions to indicate whether valid signals are present or not present. In accordance with one embodiment, signal detection logic 250 includes a clocked counter circuit to count the number of "logic 1's" within a certain period of time.

Referring now back to FIG. 2, during normal data traffic, the incoming data is random and the output (BW_out) of baseline wander logic 240 is small because of the low-pass filter 242. When the raw receiver input signals into the RX input suddenly disappear (i.e., when signal loss occurs), the input to signal detection logic 250 and decision logic 230 is dominated by the output of baseline wander logic 240. Since baseline wander logic 240 acts as a positive feedback loop, the output of decision logic 230 will be all "logic 1's" or all "logic 0's" in such a scenario. Furthermore, signal detection logic 250 may incorrectly determine that valid signals are present, due to a large output from baseline wander logic 240.

Figure 5:
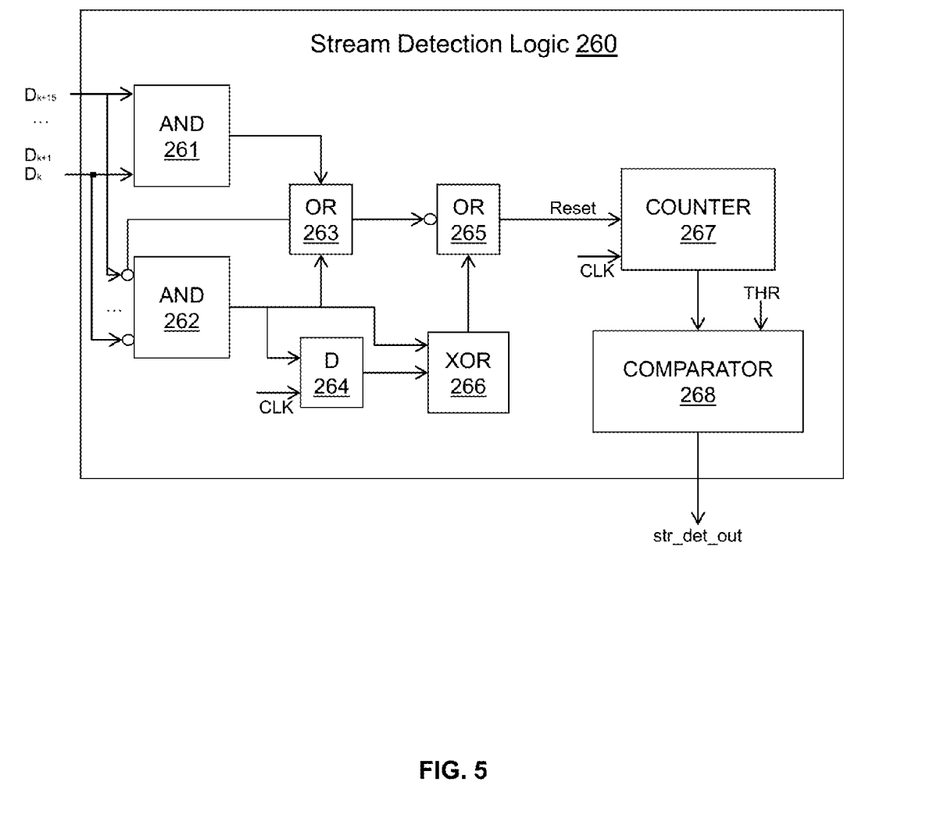
FIG. 5 illustrates one embodiment of stream detection logic of the SerDes device of FIG. 2.

To alleviate the problem, stream detection logic 260 is configured to determine when the logic levels of the equalized receiver signals, as determined by decision logic 230, correspond to a sequence of a same logic level (all "logic 1's" or all "logic 0's"). FIG. 5 illustrates one embodiment of stream detection logic 260 of the SerDes device 200 of FIG. 2. As seen in FIG. 5, stream detection logic 260 includes a combination of logic gates including AND-gates 261 and 262, OR-gates 263 and 265, and an exclusive OR (XOR) gate 266. For example, AND-gate 261 detects sequences of all "logic 1's" and AND-gate 262 detects sequences of all "logic 0's". Stream detection logic 260 also includes a D flip flop 264, a counter 267, and a comparator 268.

Stream detection logic 260 counts a number of consecutive "logic 1's" or "logic 0's" out of decision logic 230 and compares the count to a threshold value THR. If the count exceeds the threshold value THR, the stream detection output (str_det_out) of stream detection logic 260 will indicate a loss of signal. In the embodiment of FIG. 5, 16 bits of data ($D_k$ to $D_{k+15}$) are processed per clock cycle. The counter 267 is reset unless the sequence of data contains all "logic 1's" or all "logic 0's" for at least two consecutive clock cycles. When the count of the counter 267 exceeds the threshold value THR (long sequence of "logic 1's" or "logic 0's"), the sequence is detected as indicating a loss of signal.

Referring now back to FIG. 2, the signal detection output (sig_det_out) out of signal detection logic 250 and the stream detection output (str_det_out) out of stream detection logic 260 are input to signal loss logic 270. In one embodiment, signal loss logic 270 is configured to determine that valid data traffic is absent among the raw receiver input signals. For example, signal loss logic 270 determines that valid data traffic is absent (i.e., that signal loss has occurred) when:

(i) the peak amplitudes of the equalized receiver signals are within the range of amplitude defined by the two threshold values $T_{pos}$ and $T_{neg}$ as determined by signal detection logic 250 when performing amplitude ranging, or (ii) the logic levels of the equalized receiver signals correspond to a sequence of a same logic level (e.g., "logic 1" or "logic 0") as determined by stream detection logic 260 when performing sequence detection.

In accordance with one embodiment, signal loss logic 270 is an OR-gate that outputs a signal absent signal (sig_abs). The signal absent signal out of signal loss logic 270 may be used to reset or power down a receiver portion of the SerDes device 200, in accordance with one embodiment, when signal loss is determined to have occurred.

In this manner, when signal loss actually occurs (i.e., when valid data traffic is no longer present in the raw receiver input signals), both signal detection logic 250 and stream detection logic 260 are involved in verifying that signal loss has indeed occurred. Stream detection logic 260 acts as a backup or check on signal detection logic 250. In the case where signal detection logic 250 incorrectly determines that signal loss has not occurred, due to the operation of decision logic 230 with baseline wander logic 240, stream detection logic 260 will correctly detect the signal loss.

Figure 6:
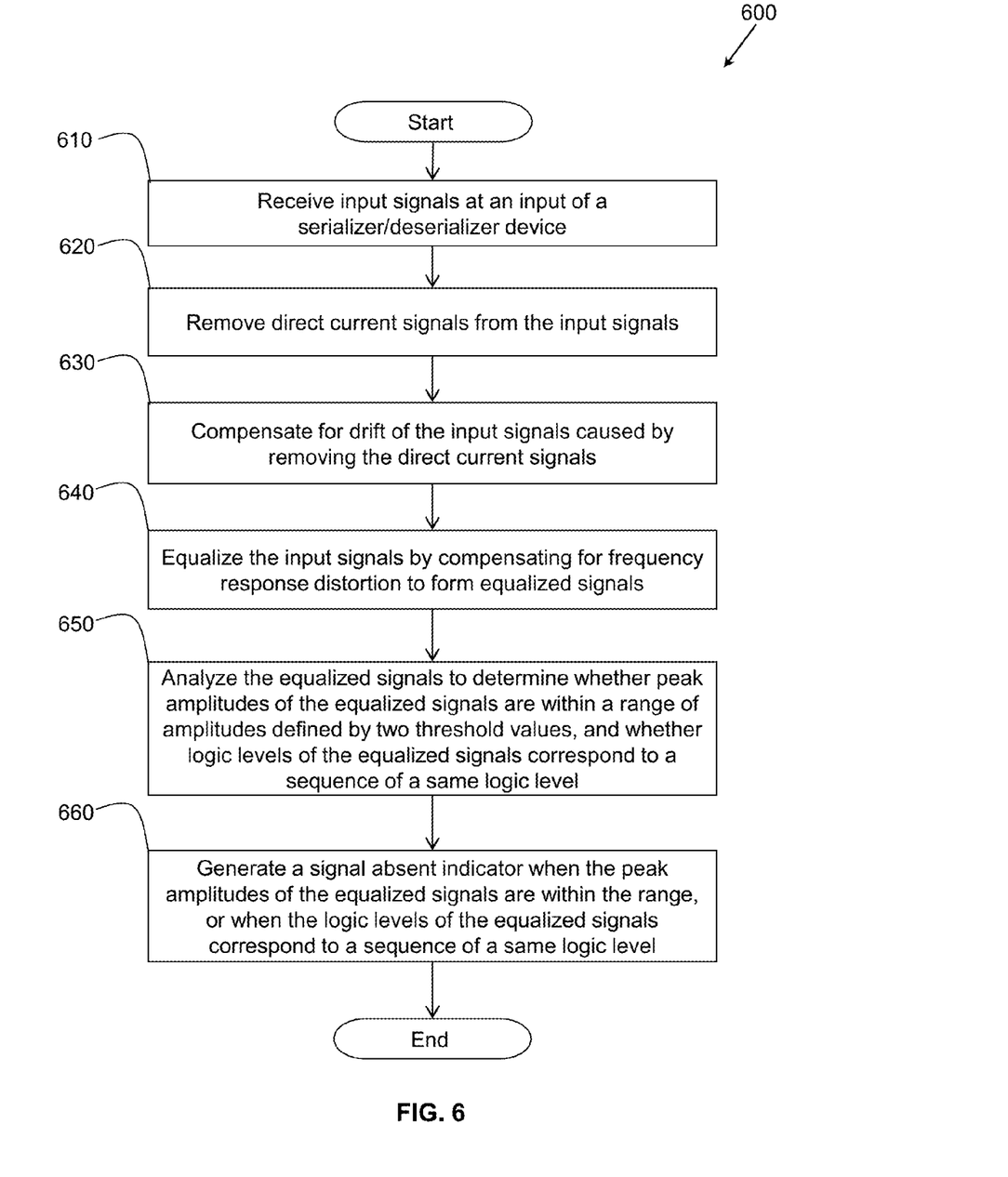
FIG. 6 illustrates one embodiment of a method, performable by the SerDes device of FIG. 2, for determining signal loss in the data communication network of FIG. 1.

FIG. 6 illustrates one embodiment of a method 600 for determining signal loss in a data communication network according to one embodiment. The method 600 can be implemented in software, firmware, hardware, or any combination thereof. For example, the method 600 can be performed by a SerDes device similar to the SerDes device 200 of FIG. 2 in a data communication network similar to the data communication network 100 of FIG. 1 Method 600 will be described from the perspective that, as data is communicated from one part of a communication network (e.g., the communication network 100 of FIG. 1) to another part of the communication network through a communication channel, a SerDes device is used. The SerDes device supports two way communications through the channel (e.g., the channel CH1 of FIG. 1) by performing parallel-to-serial and serial-to-parallel transformations of data. In one embodiment, the communication channel is a wired communication channel configured as a differential twisted pair of copper wires. In another embodiment, the communication channel is an optical fiber.

Method 600 starts when a first host device (e.g., H1 of FIG. 1) attempts to communicate with a second host device (e.g., H2 of FIG. 1), or vice versa, over a serial data communication channel (e.g., CH1 of FIG. 1). At 610, a SerDes device receives input signals at an input (e.g., RX input of FIG. 2). The input signals may include one or more of noise signals, DC signals, and modulated data signals (e.g., pulse amplitude modulated signals).

At 620, the SerDes device removes DC signals from the input signals. In accordance with one embodiment, an A/C coupling filter (e.g., coupling logic 210 of FIG. 2) removes any DC bias from the input signals, allowing only the AC components to pass. At 630, the SerDes device (e.g., baseline wander logic 240 of SerDes device 200) compensates for any drifting (baseline wandering) of the input signals out of the A/C coupling filter. At 640, after the input signals are A/C coupled and compensated for drift, the SerDes device (e.g., equalization logic 220 of SerDes device 200) equalizes the input signals by compensating for frequency response distortion to form equalized signals. Frequency response distortion of the input signals can be caused by, for example, a serial data communication channel and/or a PHY device.

At 650, the SerDes device (e.g., signal detection logic 250 of SerDes device 200) analyzes the equalized signals to determine whether peak amplitudes of the equalized signals are within a range of amplitudes defined by two threshold values (i.e., amplitude ranging is performed). Furthermore, at 650, the SerDes device (e.g., decision logic 230 and stream detection logic 260 of SerDes device 200) analyzes the equalized signals to determine whether logic levels of the equalized signals correspond to a sequence of a same logic level (e.g., a sequence of "logic 1's" or "logic 0's"). That is, sequence detection is performed.

At 660, the SerDes device (e.g., signal loss logic 270 of SerDes device 200) generates a signal absent indicator when the peak amplitudes of the equalized signals are within the range of amplitudes or when the logic levels of the equalized signals correspond to a sequence of a same logic level, as determined at 650. The signal absent indicator (e.g., sig_abs of FIG. 2) indicates that valid data traffic is absent (i.e., not present) among the input signals (e.g., when sig_abs is a "logic 1"). In accordance with one embodiment, valid data traffic includes pulse amplitude modulated (PAM) signals that arrive at the RX input of FIG. 2 in effectively a random manner. The signal absent indicator can trigger the SerDes device to reset or power down a receiver portion of the SerDes device, in accordance with one embodiment.

Furthermore, the SerDes device (e.g., signal detection logic 250 of SerDes device 200) may generate a signal present indicator (e.g., a defined logic state of sig_det_out of FIG. 2) when the peak amplitudes of the equalized signals are outside the range of amplitudes defined by the two threshold values. That is, the signal present indicator indicates that valid data traffic is present among the input signals. However, in one embodiment, the signal present indicator can be over-ruled by the signal absent indicator (e.g., in the case where signal detection logic 250 incorrectly determines that signal loss has not occurred due to the operation of decision logic 230 with baseline wander logic 240, as previously described herein).

In this manner, when signal loss actually occurs (i.e., when valid data traffic is no longer present in the input signals), two approaches (amplitude ranging and sequence detection) are involved in verifying that signal loss has indeed occurred. Sequence detection acts as a backup or check to amplitude ranging. In the case where amplitude ranging incorrectly determines that signal loss has not occurred, due to baseline wander compensation, sequence detection will correctly detect the signal loss.

Integrated Circuit Device Embodiment

Figure 7:
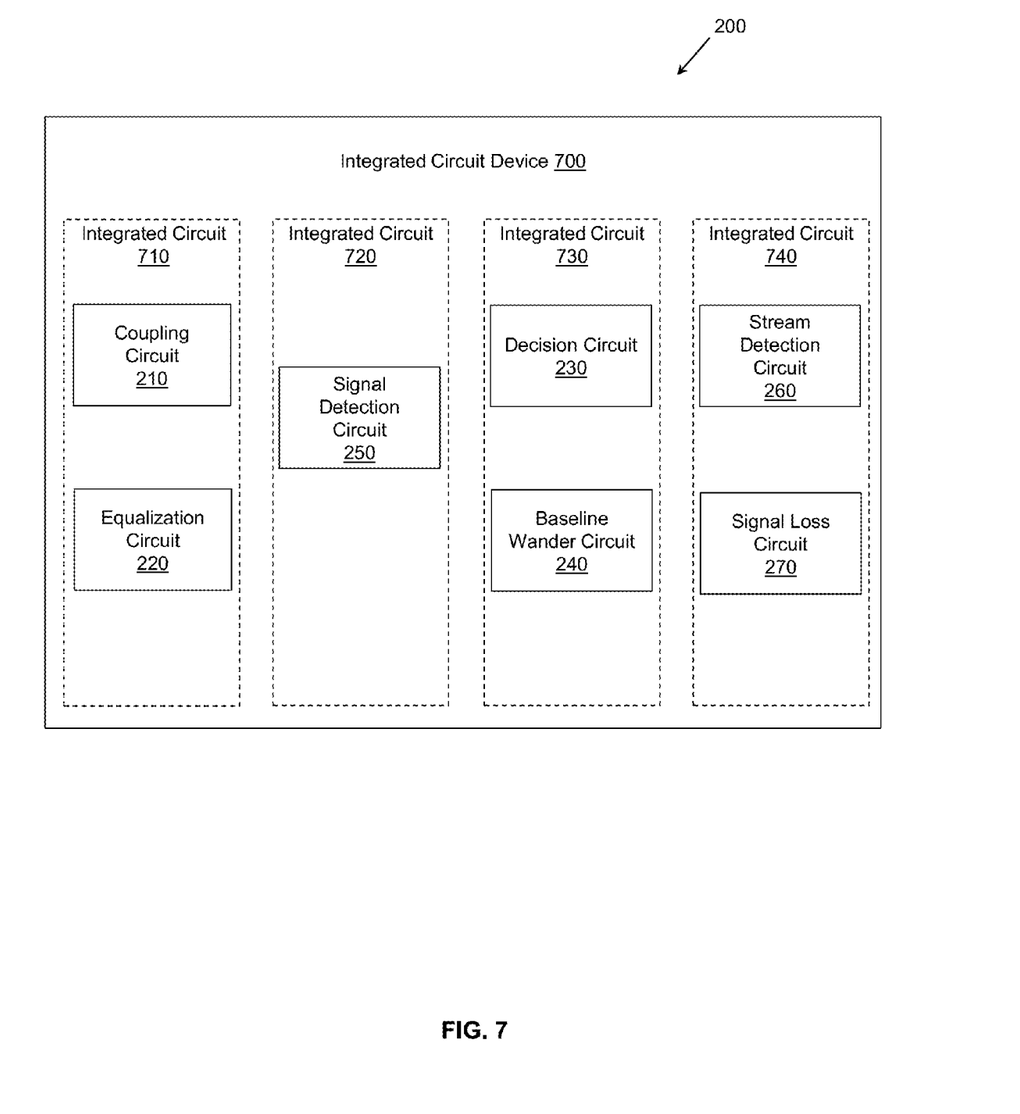
FIG. 7 illustrates one embodiment of the SerDes device of FIG. 2 implemented as an integrated circuit device.

FIG. 7 illustrates one embodiment of the SerDes device 200 of FIG. 2 implemented as an integrated circuit device 700. In this embodiment, a coupling circuit 210 and an equalization circuit 220 are embodied as a separate integrated circuit 710. A signal detection circuit 250 is embodied as a separate integrated circuit 720. A decision circuit 230 and a baseline wander circuit 240 are embodied as a separate integrated circuit 730. A stream detection circuit 260 and a signal loss circuit 270 are embodied as a separate integrated circuit 740.

The circuits are coupled via connection paths to communicate signals. While integrated circuits 710, 720, 730, and 740 are illustrated as separate integrated circuits, two or more of said integrated circuits may be integrated into a common integrated circuit device 700. Additionally, integrated circuits 710, 720, 730, and 740 may be combined into fewer integrated circuits or divided into more integrated circuits than illustrated.

In another embodiment, the coupling circuit 210, the equalization circuit 220, the decision circuit 230, the baseline wander circuit 240, the signal detection circuit 250, the stream detection circuit 260, and the signal loss circuit 270 (which are illustrated in integrated circuits 710, 720, 730, and 740) may be combined into a separate application-specific integrated circuit. In other embodiments, portions of the functionality associated with the coupling circuit 210, the equalization circuit 220, the decision circuit 230, the baseline wander circuit 240, the signal detection circuit 250, the stream detection circuit 260, and the signal loss circuit 270 may be embodied as firmware executable by a processor and stored in a non-transitory memory (e.g., a non-transitory computer storage medium).

Apparatus, methods, and other embodiments associated with reliably determining signal loss on a data communication network have been described. According to one embodiment, an integrated circuit device includes a signal detection circuit configured to determine when peak amplitudes of equalized receiver signals are within or outside of a range of amplitudes. The range of amplitudes is defined by two threshold values and the equalized receiver signals are derived from raw receiver input signals. The integrated circuit device also includes a decision circuit configured to determine logic levels of the equalized receiver signals, and a stream detection circuit configured to determine when the logic levels of the equalized receiver signals correspond to a sequence of a same logic level. The integrated circuit device further includes a signal loss circuit configured to determine when valid data traffic is absent among the raw receiver input signals. Valid data traffic is determined to be absent when the peak amplitudes of the equalized receiver signals are within the range as determined by the signal detection circuit, or when the logic levels of the equalized receiver signals correspond to a sequence of a same logic level as determined by the stream detection circuit.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

The term "coupled", as used herein, refers to being directly or indirectly connected. For example, when two elements are coupled, they can be either directly connected, or connected with intervening elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

What is claimed is:

1. An apparatus comprising:
   signal detection logic configured to determine when peak amplitudes of equalized receiver signals are within or outside of a range of amplitudes defined by two threshold values, wherein the equalized receiver signals are derived from raw receiver input signals;
   decision logic configured to determine logic levels of the equalized receiver signals;
   stream detection logic configured to determine when the logic levels of the equalized receiver signals correspond to a sequence of a same logic level; and
   signal loss logic configured to determine that valid data traffic is absent among the raw receiver input signals when:
      (i) the peak amplitudes of the equalized receiver signals are within the range as determined by the signal detection logic, or
      (ii) the logic levels of the equalized receiver signals correspond to the sequence of the same logic level as determined by the stream detection logic.

2. The apparatus of claim 1, wherein the apparatus is part of a serializer/deserializer logic configured to convert data between serial interfaces and parallel interfaces.

3. The apparatus of claim 1, further comprising equalization logic configured to generate the equalized receiver signals by compensating for frequency response distortion in the raw receiver input signals.

4. The apparatus of claim 1, wherein the signal detection logic is configured to determine that valid data traffic is present among the raw receiver input signals when the peak amplitudes of the equalized receiver signals are outside of the range.

5. The apparatus of claim 1, wherein the signal detection logic includes OR logic coupled between comparator logic and judgment logic.

6. The apparatus of claim 1, wherein the stream detection logic includes counter logic coupled between a combination of logic gates and comparator logic.

7. The apparatus of claim 1, further comprising:
   coupling logic configured to remove direct current signals from the raw receiver input signals; and
   baseline wander logic configured to compensate for drift of the raw receiver input signals caused by the coupling logic.

8. The apparatus of claim 7, wherein the baseline wander logic includes gain logic configured to set a gain level to be applied to incoming logic levels from the decision logic.

9. The apparatus of claim 7, wherein the coupling logic includes a high-pass filter and the baseline wander logic includes a low-pass filter, and wherein the high-pass filter and the low-pass filter share filter circuit elements.

10. The apparatus of claim 9, wherein the filter circuit elements include at least one capacitor and at least one resistor.

11. A method comprising:
    receiving input signals at an input of a serializer/deserializer device;
    equalizing the received input signals by compensating for frequency response distortion to form equalized signals;
    analyzing the equalized signals to determine whether:
       (i) peak amplitudes of the equalized signals are within a range of amplitudes defined by two threshold values, or
       (ii) logic levels of the equalized signals correspond to a sequence of a same logic level; and
    generating a signal absent indicator when the peak amplitudes of the equalized signals are within the range or the logic levels of the equalized signals correspond to a sequence of a same logic level, wherein the signal absent indicator indicates that valid data traffic is absent among the received input signals.

12. The method of claim 11, further comprising:
    removing direct current signals from the received input signals; and
    compensating for drift of the received input signals caused by removing the direct current signals from the received input signals.

13. The method of claim 11, further comprising generating a signal present indicator when the peak amplitudes of the equalized signals are outside the range, wherein the signal present indicator indicates that valid data traffic is present among the received input signals.

14. The method of claim 11, wherein the received input signals include one or more of noise signals, direct current signals, and pulse amplitude modulated signals.

15. The method of claim 11, wherein the valid data traffic includes pulse amplitude modulated signals.

16. An integrated circuit device, the integrated circuit device comprising:
    an equalization circuit configured to generate equalized receiver signals derived from raw receiver input signals by compensating for frequency response distortion in the raw receiver input signals;
    a signal detection circuit configured to determine when peak amplitudes of the equalized receiver signals are within or outside of a range of amplitudes defined by two threshold values;
    a decision circuit configured to determine logic levels of the equalized receiver signals;
    a stream detection circuit configured to determine when the logic levels of the equalized receiver signals correspond to a sequence of a same logic level; and
    a signal loss circuit configured to determine that valid data traffic is absent among the raw receiver input signals when:
       the peak amplitudes of the equalized receiver signals are within the range as determined by the signal detection circuit; or
       the logic levels of the equalized receiver signals correspond to a sequence of a same logic level as determined by the stream detection circuit.

17. The integrated circuit device of claim 16, wherein the integrated circuit device is part of a serializer/deserializer circuit configured to convert data between serial interfaces and parallel interfaces.

18. The integrated circuit device of claim 16, further comprising a coupling circuit configured to remove direct current signals from the raw receiver input signals.

19. The integrated circuit device of claim 18, further comprising a baseline wander circuit configured to compensate for drift of the raw receiver input signals caused by the coupling circuit.

* * * * *